United States Patent
Blumenfeld et al.

[11] 3,723,468
[45] Mar. 27, 1973

[54] KETONITRILES AND METHOD FOR THEIR PRODUCTION

[75] Inventors: Georg Blumenfeld, Troisdorf-Siegler; Gerhard Daum, Cologne-Raderberg; Hermann Richtzenhain, Schwellbach, all of Germany

[73] Assignee: Dynamit Nobel AG, Troisdorf, Germany

[22] Filed: Jan. 28, 1970

[21] Appl. No.: 6,575

[30] Foreign Application Priority Data

Feb. 4, 1969 Germany............P 19 05 258.5

[52] U.S. Cl..................260/340.7, 424/278
[51] Int. Cl.........................C07d 15/02
[58] Field of Search..................260/340.7

[56] References Cited

UNITED STATES PATENTS 3,169,879  2/1965  Wahl et al..................260/340.7
3,428,694  2/1969  Marbet......................260/340.7

*Primary Examiner*—Alex Mazel
*Assistant Examiner*—James H. Turnipseed
*Attorney*—Burgess, Dinklage & Sprung

[57] ABSTRACT

Ketonitriles of the general formula

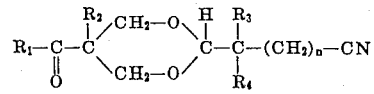

in which $R_1$ and $R_2$ signify alkyl groups with one to four carbon-atoms, $R_3$ and $R_4$ are hydrogen atoms or alkyl groups with one to four C-atoms and wherein $R_3$ and $R_4$ may also together form a carbocyclic ring preferably with five or six C-atoms and $n$ is zero, 1 or 2 produced by condensing diols of the formula

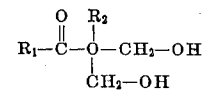

with cyanaldehydes of the formula

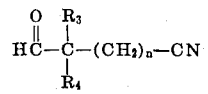

wherein $R_1$, $R_2$, $R_3$, $R_4$ and $n$ have the same meanings as set forth above, in the presence of strong acid catalysts where the diols may be in the thickly liquid, impure form. These ketonitriles are useful as herbicides.

3 Claims, No Drawings

KETONITRILES AND METHOD FOR THEIR PRODUCTION

This invention relates to ketonitriles. It more particularly refers to special novel ketonitriles and to the production thereof.

One aspect of this invention are ketonitriles of the formula

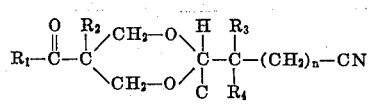

wherein $R_1$ and $R_2$ may be the same or different and are each alkyl groups of up to four carbon atoms in straight or branched chain configuration; $R_3$ and $R_4$ may be the same or different and are each hydrogen or alkyl of up to four carbon atoms which may form a carbocyclic ring together with the carbon atom to which they are attached of about five or six ring carbon atoms which ring may have one or more, up to about four lower alkyl substituents of up to about 4 carbon atoms each; and $n$ is a whole number of zero to 2.

Of special note is the ketonitrile of the above structural general formula where $R_1$, $R_2$, $R_3$, and $R_4$ are each methyl and $n$ is 2. This compound has the structural formula

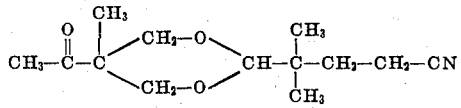

Another special ketonitrile of this invention is the compound where $R_1$ and $R_2$ are methyl, $R_3$ is ethyl, $R_4$ is n-butyl, and $n$ is 2. This compound has the structural formula

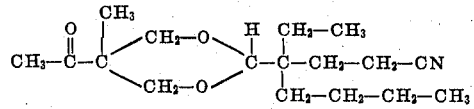

Another aspect of this invention is in the production of these ketonitriles which takes place by condensation of diols of the general formula

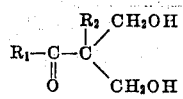

with cyanaldehydes of the general formula

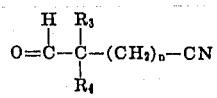

in the presence of strongly acid catalysts in an acetal type of reaction. The production of the diol reactants is performed by the known condensation of formaldehyde with aliphatic ketones which contain a methylene group besides the keto group, such as, for example, methylethylketone, diethyl ketone or methylisobutyl-ketone, in the presence of alkaline catalysts.

The production of these diols, although known, presents difficulties when it is desired or necessary to produce them in pure form because the purification of the raw diol products, which are highly viscous liquids permeated with crystals, can be achieved only by multiple recrystallizations.

It has therefore been surprisingly found that it is possible to carry out the condensation reaction of this invention using these impure materials which are only to a slight degree crystallized to obtain the ketonitriles of this invention in good yields and adequate purity.

Suitable cyanaldehydes are, for example, cyanoacetaldehyde, 3-cyanopropionaldehyde, 4-cyanobutyraldehyde, 2,2-dimethyl-4-cyanobutyraldehyde, 2,2-diethyl-4-cyanobutyraldehyde, 2-ethyl-2-isopropyl-4-cyanobutyraldehyde, 2-ethyl-2-n-butyl-4-cyanobutyraldehyde, 1-($\beta$-cyanoethyl)-cyclohexene-(3)-aldehyde and 1-($\beta$-cyanoethyl)-cyclohexyl-aldehyde.

The condensation of the ketodiols with the cyanaldehydes is, for example, carried out in such a manner that the components are heated, possibly in admixture with an inert solvent, for example, an aromatic hydrocarbon, such as benzene, toluene or xylene, or a chlorinated hydrocarbon, such as chloroform, carbon-tetrachloride, 1,2-dichloroethane or trichloroethylene, in the presence of strongly acid catalysts, such as, for example, phenyl-sulfonic acid, benzenesulfonic acid, toluenesulfonic acid or hydrogen chloride, and the formed water is azeotropically removed from the reaction mixture.

The products in accordance with the invention are present as isomer-mixtures dues to the possible axial or equatorial arrangement of the substituents of $C_2$ and $C_5$ with respect to the 1,3-dioxane ring.

It was possible to separate the ketonitrile so produced by condensation from the cyanaldehyde and diol reactants (e.g., 2-methyl-2-acetyl-1,3-propandiol with 2,2-dimethyl-4-cyano-butyraldehyde), for example, by fractionating and/or crystallization. From these particular illustrated reactants a compound melting at 67°–68 C, which represents one of the possible isomers, can be separated from the reaction mixture which melts about 10°–15° C lower.

The reaction temperature is not critical and is dependent, when using an azeotroping agent for the removal of water, on the boiling point of the azeotrope or of the water. The reaction can take place at temperatures as low as below 80°C. It is preferred that the azeotroping agents and the inert solvents are the same material, preferably with boiling points which are in the range of about 80°–160°C.

The ketonitriles in accordance with the invention are valuable herbicides and also are intermediate products for the construction of other compounds, such as keto acids, by hydrolysis of the nitrile group.

The following examples serve to illustrate this invention without being limiting thereon:

EXAMPLE 1

One hundred thirty-two g of 2,2-dimethylolbutanone-(3), 125 g of 2,2-dimethyl-4-cyanobutyraldehyde, 200 ml xylene and 2 g p-toluene-sulfonic acid were heated together in a 1-liter two-neck-flask which was provided with a water separator, a reflux condenser, and a magnetic stirrer, to such an extent that it was possible to azeotrope off the reaction water with the boiling xylene solvent. The bath temperature was maintained at about 165°–170°C. After 60 and 120 minutes, respectively, the condensation reaction was again accelerated by the addition of 2 g each time of p-toluene-sulfonic acid. After 180 minutes, 18 ml water had separated, thus signifying completion of the reaction which was then terminated.

Most of the xylene was distilled off and the remaining precipitate was filtered with suction. The filtrate was mixed with 200 ml toluene, well washed with 10 weight percent $K_2CO_3$-aqueous solution and afterwards with saturated NaCl-solution, and the organic layer was dried over $K_2CO_3$. After filtrating off from $K_2CO_3$ the solvent was separated via a 40 cm-Vigreux-column and the remainder of 210 g of product distilled in vacuum.

After a first running of 15 g, there was obtained at (BP) 0.1 135°–147°C a colorless liquid which solidified as it came off in the first running. It had an indistinct melting point between 40° and 45° C.

Yield 177.5 g = 74% of 2-[(1,1-dimethyl-3-cyano)-propyl]-5-methyl-5-acetyl-dioxane-(1,3).

The compound is present as isomer mixture.

The isomeric mixture may be separated by fractionated crystallization from petroleum ether having a boiling point of 40°–60°C. A pure isomer, which is clearly distinguishable by its crystal form (flat triangles) and its melting point (67°–68°C), from the remainder of the mixture (needles having an indistinct melting point which may vary from about 50° to about 59°C) can thus be recovered.

|  | C | H | N |
|---|---|---|---|
| Analysis: for $C_{13}H_{21}NO_3$ calculated | 65.23% | 8.84% | 5.85% |
| Pure isomer of melting point 67–68° found | 65.62% | 8.72% | 5.82% |
| Mixture of melting point 58–59° found | 65.49% | 9.00% | 5.95% |

EXAMPLE 2

Ninety five g 2,2-dimethylolbutanone-(3), 130 g 2-ethyl-2-n-butyl-4-cyanbutyraldehyde, 400 ml benzene and 2,5 g p-toluene-sulfonic acid were heated together in a 1-liter two-neck-flask which was provided with a water separator, a reflux condenser, and a magnetic stirrer. At a bath temperature of about 120°C, the reaction water was carried off with the boiling benzene. After 150 minutes, the calculated stoichiometric amount of condensed water (13 ml) had separated.

The benzene was distilled off to a large extent, the turbid reaction mixture was hot filtered, and the filtrate was freed, in the water jet vacuum, from the remaining solvent and then distilled. After a first running of 49 g which contained partly unconverted starting material, there was obtained at $(Bp)_{0.5}$ 150°–170°C 136 g of 2-[(1-ethyl-1-n-butyl-3-cyano)-propyl]-5 methyl-5-acetyl-dioxane-(1.3) = 64 percent of theory as a colorless oily liquid. In the purification by redistillation the main fraction passed overhead at boiling point$_{0.1}$ 145°–152°C $n_D^{20}$, 1.4716. The isomer mixture was not resolved.

|  | C | H | N |
|---|---|---|---|
| Analysis for $C_{17}H_{25}NO_3$ calculated: | 69.11% | 9.90% | 4.74% |
| found: | 68.79% | 9.95% | 4.96% |

What is claimed is:

1. A ketonitrile of the formula

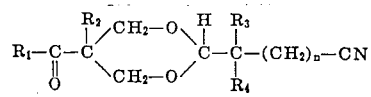

wherein $R_1$ and $R_2$ each is an alkyl of one to four C-atoms $R_3$ and $R_4$ are hydrogen or an alkyl of one to four C-atoms provided that $R_3$ and $R_4$, together with the carbon atom to which they are attached, may also be a carbocyclic ring of five to six C-atoms, and $n$ is zero to 2.

2. A ketonitrile as claimed in claim 1 wherein $R_1$, $R_2$, $R_3$, and $R_4$ are each methyl, and $n$ is 2, having the structural formula:

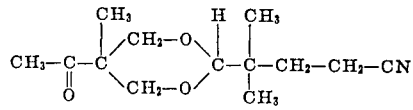

3. A ketonitrile as claimed in claim 1 wherein $R_1$ and $R_2$ are each methyl, $R_3$ is ethyl, $R_4$ is n-butyl, and $n$ is 2, having the structural formula:

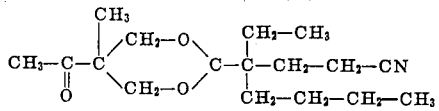

* * * * *